US010000091B2

(12) United States Patent
Gayton et al.

(10) Patent No.: US 10,000,091 B2
(45) Date of Patent: Jun. 19, 2018

(54) TIRE COMPRISING A TREAD MADE UP OF SEVERAL ELASTOMERIC COMPOUNDS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Christophe Gayton, Clermont-Ferrand (FR); Vincent Martin, Clermont-Ferrand (FR)

( * ) Notice: Subject to any disclaimer, the term of this patent is extended or adjusted under 35 U.S.C. 154(b) by 192 days.

(21) Appl. No.: 14/650,876

(22) PCT Filed: Dec. 2, 2013

(86) PCT No.: PCT/EP2013/075246
§ 371 (c)(1),
(2) Date: Jun. 10, 2015

(87) PCT Pub. No.: WO2014/090620
PCT Pub. Date: Jun. 19, 2014

(65) Prior Publication Data
US 2015/0314651 A1    Nov. 5, 2015

(30) Foreign Application Priority Data

Dec. 10, 2012   (FR) ...................................... 12 61832

(51) Int. Cl.
*B60C 11/00* (2006.01)
*B60C 5/00* (2006.01)
(Continued)

(52) U.S. Cl.
CPC .......... *B60C 11/005* (2013.01); *B60C 1/0016* (2013.01); *B60C 5/00* (2013.01);
(Continued)

(58) Field of Classification Search
CPC ......... B60C 2011/0025; B60C 11/0075; B60C 11/00; B60C 11/005
See application file for complete search history.

(56) References Cited

U.S. PATENT DOCUMENTS 6,247,512 B1 *   6/2001   Radulescu .............. B60C 11/18
                                                152/209.5
8,217,103 B2 *   7/2012   Thiele ................... B60C 1/0016
                                                524/262
(Continued)

FOREIGN PATENT DOCUMENTS

DE       19731525 A1   7/1998
EP       0594045 A1    4/1994
(Continued)

OTHER PUBLICATIONS

JP 62-196704U to Misao Kawaba, Tetsuro Kobayashi; Tread Structure of High-Performance Pneumatic Tire; Bridgestone Corporation.*
International Search Report PCT/EP2013/075246 dated Jan. 20, 2014.

*Primary Examiner* — Joseph S Del Sole
*Assistant Examiner* — Cedrick S Williams
(74) *Attorney, Agent, or Firm* — Dickinson Wright PLLC

(57) ABSTRACT

A tire with radial carcass reinforcement comprising a crown reinforcement itself capped radially with a tread of which the tread pattern comprises at least two circumferential grooves. The tread is made up of at least three layers, a first layer forming the radially outer part of the tread of a first compound having an electrical resistivity per unit volume $\rho_1$ such that $\log(\rho_1)$ is less than 6, a second layer radially on the inside of at least three parts, at least the axially outer parts of a second compound having an electrical resistivity per unit volume $\rho_2$ such that $\log(\rho_2)$ is greater than 10, and at least part, radially extending the at least first elastomeric compound of the first layer, of a third elastomeric compound (Continued)

having an electrical resistivity per unit volume $\rho_3$ such that $\log(\rho_3)$ is less than 6, a third layer radially furthest towards the inside of at least five parts, at least the axially outer parts of a third elastomeric compound having a maximum value of $\tan(\delta)$, denoted $\tan(\delta)$max, of less than 0.080, at least two parts of the second compound, and at least part of the third layer, that radially extends the at least one part of the second layer of the third elastomeric compound.

12 Claims, 2 Drawing Sheets

(51) Int. Cl.
    *B60C 1/00*     (2006.01)
    *B60C 19/08*     (2006.01)
(52) U.S. Cl.
    CPC ...... *B60C 11/0041* (2013.01); *B60C 11/0075* (2013.01); *B60C 19/082* (2013.01)

(56) References Cited

U.S. PATENT DOCUMENTS

| | | | | |
|---|---|---|---|---|
| 2004/0069386 | A1* | 4/2004 | Janajreh | B60C 9/20 |
| | | | | 152/152.1 |
| 2006/0048874 | A1* | 3/2006 | Maruoka | B29D 30/3028 |
| | | | | 152/209.5 |
| 2010/0018618 | A1* | 1/2010 | Moorhead | B60C 11/00 |
| | | | | 152/209.5 |
| 2012/0132331 | A1 | 5/2012 | Collette et al. | |
| 2012/0285590 | A1* | 11/2012 | Sandstrom | B60C 1/0016 |
| | | | | 152/209.5 |

FOREIGN PATENT DOCUMENTS

| | | | |
|---|---|---|---|
| EP | 2457743 A1 | 5/2012 | |
| GB | 1255952 A | * 12/1971 | ........... B60C 1/0016 |
| JP | 2005075201 A | 3/2005 | |

* cited by examiner

TIRE COMPRISING A TREAD MADE UP OF SEVERAL ELASTOMERIC COMPOUNDS

This application is a 371 national phase entry of PCT/EP2013/075246, filed 2 Dec. 2013, which claims benefit of French Patent Application No. 1261832, filed 10 Dec. 2012, the entire contents of which are incorporated herein by reference for all purposes.

BACKGROUND

1. Field

The present disclosure relates to a tire with a radial carcass reinforcement, and more particularly a tire intended for fitting to vehicles carrying heavy loads and travelling at sustained speeds, such as lorries, tractors, trailers or buses, for example.

2. Description of Related Art

In the tires of heavy goods vehicles, the carcass reinforcement is generally fixed on either side in the area of the bead and is surmounted radially by a crown reinforcement made up of at least two layers, superimposed and formed of threads or cords which are parallel in each layer and crossed from one layer to the next forming angles of between 10° and 45° with the circumferential direction. The said working layers forming the working reinforcement may be further covered by at least one layer, called the protective layer, formed by reinforcing elements which are advantageously metallic and extensible and are called elastic. It may also comprise a layer of metal threads or cords having low extensibility, forming an angle of between 45° and 90° with the circumferential direction, this ply, called the triangulation ply, being radially located between the carcass reinforcement and the first crown ply, referred to as the working ply, formed by parallel threads or cords lying at angles not exceeding 45° in absolute value. The triangulation ply forms a triangulated reinforcement with at least the said working ply, this reinforcement having low deformation under the various stresses which it undergoes, the triangulation ply essentially serving to absorb the transverse compressive forces acting on all the reinforcing elements in the crown area of the tire.

In the case of tires for "heavy-duty" vehicles, just one protective layer is usually present and its protective elements are, in the majority of cases, oriented in the same direction and with the same angle in absolute value as those of the reinforcing elements of the radially outermost and thus radially adjacent working layer. In the case of construction plant tires intended for running on more or less uneven ground, the presence of two protective layers is advantageous, the reinforcing elements being crossed from one layer to the next and the reinforcing elements of the radially inner protective layer being crossed with the inextensible reinforcing elements of the radially external working layer adjacent to the said radially internal protective layer.

Radially on the outside of the crown reinforcement is the tread usually made up of polymeric materials intended to come into contact with the ground in the contact patch in which the tire makes contact with the ground.

Cords are said to be inextensible when the said cords, under a tensile force equal to 10% of the breaking force, exhibit a relative elongation of at most 0.2%.

Cords are said to be elastic when the said cords exhibit, under a tensile force equal to the breaking load, a relative elongation at least equal to 3% with a maximum tangent modulus of less than 150 GPa.

The circumferential direction of the tire, or longitudinal direction, is the direction corresponding to the periphery of the tire and defined by the direction in which the tire runs.

The axis of rotation of the tire is the axis about which it turns in normal use.

A radial or meridian plane is a plane containing the axis of rotation of the tire.

The circumferential mid-plane, or equatorial plane, is a plane which is perpendicular to the axis of rotation of the tire and divides the tire into two halves.

The transverse or axial direction of the tire is parallel to the axis of rotation of the tire. An axial distance is measured in the axial direction. The expression "axially on the inside of or axially on the outside of, respectively" means "of which the axial distance, measured from the equatorial plane, is respectively less than or greater than".

The radial direction is a direction that intersects the axis of rotation of the tire and is perpendicular thereto. A radial distance is measured in the radial direction. The expression "radially on the inside of or radially on the outside of, respectively" means "of which the radial distance, measured from the axis of rotation of the tire, is respectively less than or greater than".

Certain present-day tires, referred to as "road tires", are intended to run at high speed and over increasingly long journeys, because of improvements to the road network and the growth of motorway networks worldwide. Unquestionably, the set of conditions in which a tire of this type is required to run enables the distance covered to be increased because there is less tire wear; however, the endurance of the tire, and particularly that of the crown reinforcement, is adversely affected.

This is because stresses are present in the crown reinforcement; more particularly, there are shear stresses between the crown layers, combined with a significant rise in the operating temperature at the ends of the axially shortest crown layer, resulting in the appearance and propagation of cracks in the rubber at the said ends. This problem exists in the case of edges of two layers of reinforcing elements, the said layers not necessarily being radially adjacent.

In order to limit excessive temperature increases in the crown of the tire, the materials of which the tread is made are advantageously chosen to have hysteresis losses suited to the operating conditions of the tire.

Moreover, in order to improve the endurance of the crown reinforcement of the type of tire being studied, solutions relating to the structure and quality of the layers and/or profiled elements of rubber compounds which are positioned between and/or around the ends of plies and, more particularly, the ends of the axially shortest ply have already been provided.

In order to improve the resistance to degradation of rubber compounds located in the vicinity of the edges of the crown reinforcement, patent FR 1 389 428 recommends the use, in combination with a low-hysteresis tread, of a rubber profiled element covering at least the sides and marginal edges of the crown reinforcement and made up of a rubber compound with low hysteresis.

In order to avoid separations between crown reinforcement plies, patent FR 2 222 232 teaches the coating of the reinforcement ends with a pad of rubber whose Shore A hardness is different from that of the tread surmounting the said reinforcement, and greater than the Shore A hardness of the profiled element of rubber compound placed between the edges of the crown reinforcement plies and the carcass reinforcement.

French application FR 2 728 510 proposes arranging, on the one hand, between the carcass reinforcement and the crown reinforcement working ply radially closest to the axis of rotation an axially continuous ply formed of inextensible metal cords making with the circumferential direction an angle at least equal to 60° and of which the axial width is at least equal to the axial width of the shortest working crown ply and, on the other hand, between the two working crown plies an additional ply formed of metallic elements oriented substantially parallel to the circumferential direction.

French application WO 99/24269 further proposes, on each side of the equatorial plane and in the immediate axial continuation of the additional ply of reinforcing elements substantially parallel to the circumferential direction, that the two working crown plies formed of reinforcing elements crossed from one ply to the next be coupled over a certain axial distance and then uncoupled using profiled elements of rubber compound over at least the remainder of the width that the said two working plies have in common.

This improvement in the endurance of tires means that the possibility of retreading when the tread has worn away can at least be contemplated. Specifically, where there is a desire to retread the tire after the tread has worn away, in order to optimize the use of the new tread the tire that is to be retreaded must not be in too advanced a state of ageing.

In order to increase the life of the tires still further, it is common practice to choose polymeric materials that have improved wear resistance properties from which to make the tread. Because such materials usually have an adverse effect on hysteresis properties it is also known practice to make the tread of a tire from a radial superposition of two different materials in order to obtain a wearing properties-hysteresis compromise that is satisfactory for the applications envisaged.

Such tires are, for example, described in document U.S. Pat. No. 6,247,512. That document describes the superposition of two layers of materials to form the tread, the external material coming into contact with the ground being notably better performing in terms of wear whereas the internal material has hysteresis properties that allow the increases in temperature of the tire in the crown region to be limited.

It is also known practice to modify the internal layer of such treads in order to combat irregular wear of the said tread that occurs notably after the first layer that forms the exterior surface of the tread of the new tire has worn away. Such internal layers of the tread may thus comprise axially outer parts made up of more rigid materials. Such tires are, for example, described in patent applications JP2007-196864 and JP2009-286317.

SUMMARY

However, it is found that such treads are less favorable in terms of the hysteresis properties of the tire and therefore in terms of the properties of endurance and rolling resistance.

Furthermore, the selection of certain elastomeric compounds leads to problems with the removal of the electrostatic charges that build up in the vehicles. Indeed it is important for reasons of comfort, correct operation of certain on-board devices, or even safety notably in service stations, to be able to remove electrostatic charge that has built up through the tires and more specifically through the treads thereof that are in contact with the ground.

The inventors have therefore set themselves the task of being able to supply tires that allow various compromises between wearing and/or endurance and/or rolling resistance performance while maintaining the ability to remove electrostatic charge through the tires.

This objective has been achieved according to an embodiment of the invention through a tire with radial carcass reinforcement comprising a crown reinforcement itself capped radially with a tread of which the tread pattern comprises at least two circumferential grooves, which is connected to two beads via two sidewalls, the said tread being made up of at least three layers of elastomeric compounds which are radially superposed, a first layer forming the radially outer part of the tread being made up of at least one first elastomeric compound having an electrical resistivity per unit volume $\rho_1$ such that $\log(\rho_1)$ is less than 6, a second layer of elastomeric compounds radially on the inside of and in contact with the said first layer of elastomeric compound being made up of at least three parts, at least the axially outer parts of the said second layer being made up of a second elastomeric compound having an electrical resistivity per unit volume $\rho_2$ such that $\log(\rho_2)$ is greater than, at least part of the said second layer, radially extending the said at least first elastomeric compound of the said first layer, being made up of a third elastomeric compound having an electrical resistivity per unit volume $\rho_3$ such that $\log(\rho_3)$ is less than 6, a third layer of elastomeric compounds radially furthest towards the inside being made up of at least five parts, at least the axially outer parts of the said third layer being made up of a fourth elastomeric compound having a maximum value of $\tan(\delta)$, denoted $\tan(\delta)\text{max}$, of less than 0.080, at least two parts of the said third layer axially in contact with at least one axially outer part being made up of the second elastomeric compound, and at least part of the said third layer, that radially extends the said at least one part of the said second layer made up of the third elastomeric compound, being made up of the said third elastomeric compound.

Within the meaning of the embodiments of the invention, circumferential grooves may be continuous or discontinuous. Such grooves may even be continuous, with only certain parts opening to the surface of the tread of the new tire and therefore appear discontinuous at the surface of the tread of the new tire, and then actually discontinuous when the tread has partially worn away; such grooves are described for example in Patent Application WO 2011/039194.

The electric resistivity per unit volume is measured statically in accordance with Standard ASTM D 257.

The loss factor, $\tan(\delta)$, is a dynamic property of the layer of rubber compound. It is measured on a viscosity analyzer (Metravib VA4000) according to Standard ASTM D 5992-96. The response of a test specimen consisting of two cylindrical pellets each 2 mm thick and one centimeter in diameter is recorded (the test specimen is made from samples taken from a tire mid-way up the height of the layer concerned as close as possible to the region of the equatorial plane in a region that is thick enough to be able to form the test specimen), the specimen being subjected to simple alternating sinusoidal shear loadings at a frequency of 10 Hz, at a temperature of 60° C. The sweep covers an amplitude of deformation from 0.1% to 50% peak-to-peak (on the outbound cycle) then from 50% to 1% peak-to-peak (on the return cycle). The results made use of are the complex dynamic shear modulus (G*) and the loss factor $\tan(\delta)$. For the outward cycle, the maximum value of $\tan(\delta)$ observed, denoted $\tan(\delta)\text{max}$, is indicated.

The rolling resistance is the resistance appearing when the tire rolls, and reveals the increase in temperature of the said tire. It is thus represented by the hysteresis losses associated with the deformation of the tire during one revolution. The values of tan(δ) of the materials used are measured at 10 Hz between 30 and 100° C. in order to incorporate the effect of the various frequencies of deformation brought about by the revolving of the tire. The value of tan(δ) at 60° C. thus corresponds to an indication of the rolling resistance of the tire when it is being run.

According to a first alternative form of the invention, the first layer forming the radially outer part of the tread is made up of the first elastomeric compound having an electrical resistivity per unit volume $\rho_1$ such that $\log(\rho_1)$ is less than 6.

According to other alternative forms, the first layer forming the radially outer part of the tread may be made up of several elastomeric compounds, it being possible for some to have an electrical resistivity per unit volume ρ such that log(ρ) is greater than 6 and preferably greater than 8.

The inventors have first of all been able to demonstrate that the presence of the first elastomeric compound having an electric resistivity per unit volume $\rho_1$ such that $\log(\rho_1)$ is less than 6, by way of material from which to make the tread that comes into contact with the ground, and the presence of the third elastomeric compound having an electric resistivity per unit volume $\rho_3$ such that $\log(\rho_3)$ is less than 6, locally in the second layer and in the third layer as described hereinabove, make it possible to arrive at a compromise between properties associated with the nature of the second and fourth elastomeric compounds and the assurance that electrostatic charge will be able to be removed.

The fourth compound of which at least the axial outer parts of the radially innermost third layer is made up is particularly favorable to performance in terms of rolling resistance. In view of the electric resistivity per unit volume performance of the conventional compounds that display good performance in terms of rolling resistance, the inventors have demonstrated the benefit of extending radially towards the inside within the third layer those parts of the second layer that are made up of the third elastomeric compound in order to ensure that electrostatic charge is conducted from the crown reinforcement to the surface of the tread that comes into contact with the ground.

The inventors have also been able to demonstrate the benefit of a third layer comprising at least two parts made up of the second elastomeric compound. Specifically, the fourth elastomeric compound which has a maximum value of tan(δ), denoted tan(δ)max, of less than 0.080 is, as previously mentioned, favorable to performance in terms of rolling resistance but usually at the expense of performance of the wearing type.

The presence of the fourth compound may thus for example advantageously be restricted to parts of the third layer of the tread of the tire which are not directly under attack in terms of wear, throughout the life of the tire.

According to one preferred embodiment of the invention, the distance between a point on the wall forming a groove and the fourth elastomeric compound is greater than 1 mm.

The fourth elastomeric compound determined for its hysteresis properties is usually not very cohesive. This preferred embodiment of the invention will thus notably make it possible to limit the spread of cracks in the bottoms of grooves which are liable to the initiation of such cracks because of the possible presence of stones.

For preference also according to the invention, the said at least two parts of the said third layer that are made up of the second elastomeric compound are axially centered on a circumferential plane passing through one of the said at least two circumferential grooves.

The presence of the second elastomeric compound will thus notably make it possible to keep the abovementioned minimum distance of 1 millimeter. This second elastomeric compound may thus offer compromises in performance in terms of cohesion, wear and hysteresis which notably make it possible to limit the spread of cracks while for example affording performance in terms of wear and rolling resistance that is somewhere between the first and fourth elastomeric compounds.

According to such embodiments, it is furthermore possible to regroove the tread pattern before envisaging retreading without the risk of seeing the fourth elastomeric compound become visible at the surface of the tread.

According to a first alternative form of the invention, with the tread pattern comprising an even number of circumferential grooves, the said second layer comprises an odd number of parts made up of the third elastomeric compound.

According to this first alternative form of the invention, the conduction path or paths formed by the first elastomeric compound and the third elastomeric compound from the crown reinforcement through the three layers is or are advantageously positioned between the grooves so that this path definitely reaches the surface of the tread that comes into contact with the ground. Those parts of the second and third layers that are made up of the third compound are preferably axially closest to the circumferential mid-plane in order to ensure the most effective possible contact with the ground. This is because the part of the tread of the tire corresponding to the circumferential mid-plane forms part of the region of the tire that is compressed the most during running and is definitely in contact with the ground. For preference also, a part made up of the third compound is centered on the circumferential mid-plane and when the number of parts made up of the third elastomeric compound is greater than or equal to three, the said parts are distributed symmetrically about this circumferential mid-plane.

According to this first alternative form of the invention, the said third layer of elastomeric compounds comprises an even number of parts made up of the second elastomeric compound.

Advantageously also, those parts of the third layer that are made up of the second elastomeric compound axially separate two parts made up of the fourth elastomeric compound and/or two parts made up of the third elastomeric compound and/or a part made up of the third elastomeric compound from a part made up of the fourth elastomeric compound.

According to a second alternative form of the invention, with the tread pattern comprising an odd number of circumferential grooves, the said second layer of elastomeric compounds is made up of at least five parts, and the said second layer comprises an even number of parts made up of the third elastomeric compound.

As in the case of the first alternative form, according to this second alternative form of the invention, the conduction paths formed by the first elastomeric compound and the third elastomeric compound from the crown reinforcement through the three layers are advantageously positioned between the grooves so that this path definitely reaches the surface of the tread that comes into contact with the ground. Those parts of the second and third layers that are made up of the third compound are preferably axially closest to the circumferential mid-plane in order to ensure the most effective possible contact with the ground, and distributed symmetrically about this circumferential mid-plane.

According to this second alternative form of the invention, the said third layer of elastomeric compounds comprises an odd number of parts made up of the second elastomeric compound.

Advantageously also, as in the case of the first alternative form, those parts of the third layer that are made up of the second elastomeric compound axially separate two parts made up of the fourth elastomeric compound and/or two parts made up of the third elastomeric compound and/or a part made up of the third elastomeric compound from a part made up of the fourth elastomeric compound.

According to other alternative forms of the invention, with the tread pattern comprising an even number of circumferential grooves, the second layer may comprise an even number of parts made up of the third elastomeric compound notably in order to meet industrial requirements. The positioning of the conduction path or paths formed by the first elastomeric compound and the third elastomeric compound is then no longer as close as possible to the circumferential mid-plane. A symmetric distribution about this circumferential mid-plane may be maintained.

According to other alternative forms of the invention, with the tread pattern comprising an odd number of circumferential grooves, the second layer may comprise an odd number of parts made up of the third elastomeric compound, notably in order to meet industrial requirements. It then may prove difficult to maintain a symmetric distribution about the circumferential mid-plane.

According to one advantageous embodiment of the invention, the third elastomeric compound present in the second and third layers is identical to the first elastomeric compound.

One advantageous alternative form of the invention even provides for the presence of a fourth layer made up at least in part of the fourth elastomeric compound radially on the inside of the third layer and in contact therewith.

The presence of this fourth layer may make it possible to reduce temperature rises of the tread still further during the desired use of the tire.

The presence of this fourth layer may even make it possible to reduce the operating temperature of the tire in the crown region in order to allow the rolling resistance of the tire to be lowered.

Because this fourth layer consists in part of the fourth compound, it is advantageously also radially interrupted by the said third compound in order to extend radially the said at least one part of the said third layer made up of the third elastomeric compound. According to such an embodiment of the invention, the tread thus comprises, around the equatorial plane, a region of electrical conductivity from the crown reinforcement as far as the surface of the tread.

Advantageously, according to the invention, the ratio of the volume of the first elastomeric compound to the sum of the volumes of the four elastomeric compounds is between 25 and 70%.

Advantageously, according to the invention, the ratio of the volume of the third elastomeric compound to the sum of the volumes of the four elastomeric compounds is between 5 and 10%.

Advantageously too, the ratio of the volume of the second elastomeric compound to the sum of the volumes of the four elastomeric compounds is between 10 and 40%.

Advantageously also, the ratio of the volume of the fourth elastomeric compound to the sum of the volumes of the four elastomeric compounds is less than 25%.

According to the invention, the abovementioned volume measurements are performed on tires in the new condition which have not been driven on and which therefore do not display any tread wear.

According to one embodiment of the invention, the crown reinforcement of the tire is formed of at least two working crown layers of inextensible reinforcing elements, crossed from one layer to the other, forming, with the circumferential direction, angles of between 10° and 45°.

According to other embodiments of the invention, the crown reinforcement further comprises at least one layer of circumferential reinforcing elements.

One embodiment of the invention also makes provision for the crown reinforcement to be supplemented radially on the outside by at least one additional layer, referred to as a protective layer, of reinforcing elements, called elastic, oriented with respect to the circumferential direction at an angle of between 10° and 45° and in the same direction as the angle formed by the inextensible elements of the working layer radially adjacent to it.

According to any one of the embodiments of the invention mentioned hereinabove, the crown reinforcement may further be supplemented, radially on the inside between the carcass reinforcement and the radially internal working layer closest to the said carcass reinforcement, by a triangulation layer of metallic inextensible reinforcing elements made of steel forming with the circumferential direction an angle greater than 60° and in the same direction as the direction of the angle formed by the reinforcing elements of the radially closest layer of the carcass reinforcement.

BRIEF DESCRIPTION OF DRAWINGS

Other details and advantageous features of embodiments of the invention will become apparent hereinafter from the description of exemplary embodiments of the invention which are given with reference to FIGS. 1 to 4, which depict.

The figures are not represented to scale in order to make them easier to understand.

DETAILED DESCRIPTION OF SPECIFIC EMBODIMENTS

Figure 1:
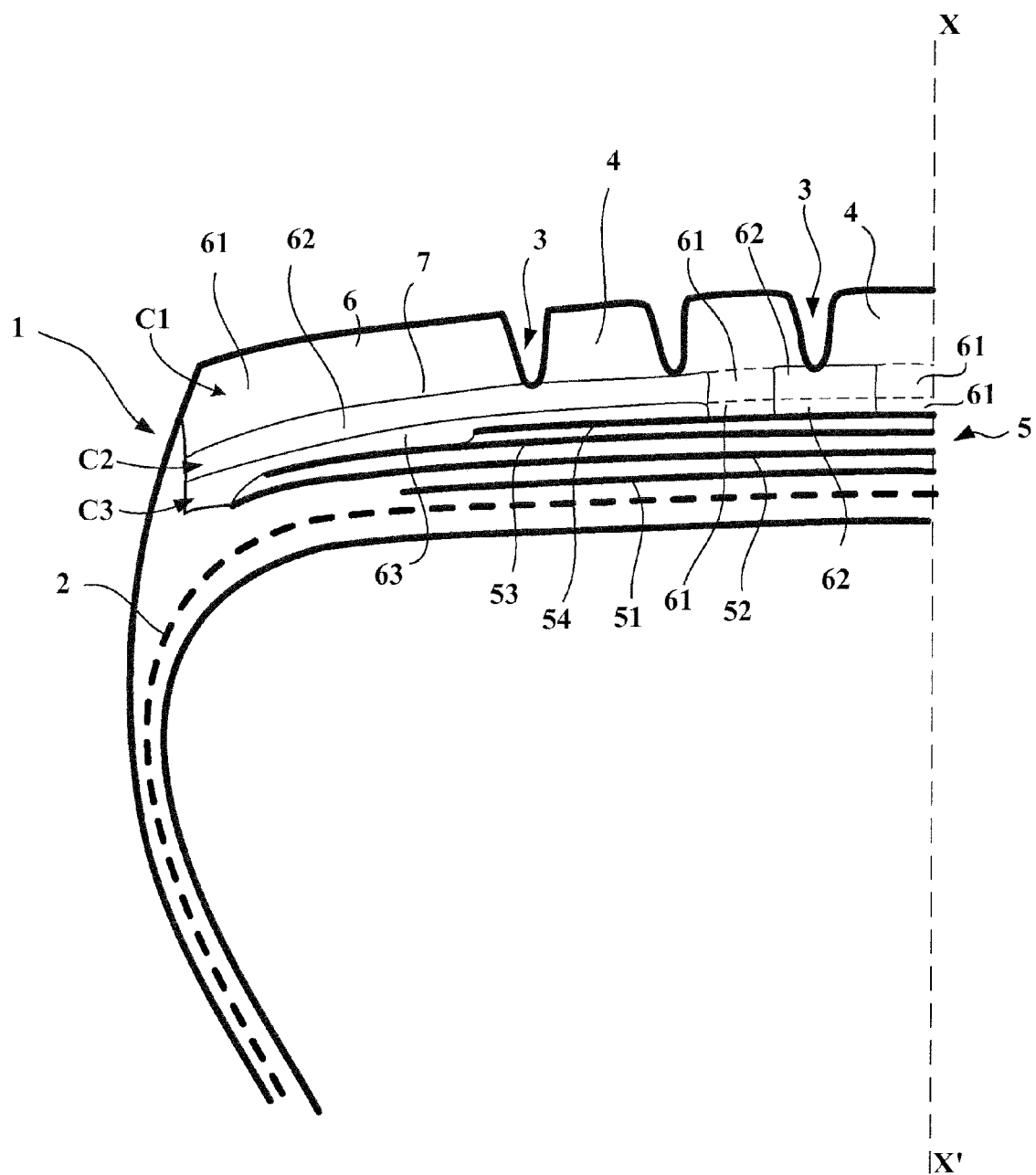
in FIG. 1, a meridian view of a tire layout according to a first embodiment of the invention, in FIG. 2, a meridian view of a tread layout of the tire according to a first embodiment of the invention, in FIG. 3, a meridian view of a tread layout of the tire according to a second embodiment of the invention, in FIG. 4, a meridian view of a tread layout of the tire according to a third embodiment of the invention.

FIG. 1 depicts just half a view of a tire which continues symmetrically about the axis XX' which represents the circumferential mid-plane or equatorial plane of a tire.

In FIG. 1, the tire 1, of size 275/70 R 22.5, comprises a radial carcass reinforcement 2 anchored in two beads around bead wires, not depicted in the drawings. The carcass reinforcement 2 is formed of a single layer of metal cords. The carcass reinforcement 2 is hooped by a crown reinforcement 5, itself capped by a tread 6. The tread comprises grooves 3 forming ribs 4.

The low regions and the beads of the tire 1 are notably not depicted in the figures.

In FIG. 1, the crown reinforcement 5 is formed radially from the inside to the outside:

of a triangulation layer 51 formed of non-wrapped inextensible 9.28 metal cords which are continuous across the entire width of the ply and oriented at an angle of 65°, of a first working layer 52 formed of non-wrapped inextensible 11.35 metal cords which are continuous across the entire width of the ply, oriented at an angle of 26°, of a second working layer 53 formed of non-wrapped inextensible 11.35 metal cords which are continuous across the entire width of the ply, oriented at an angle of 18° and crossed with the metal cords of the first working layer, of a protective layer 54 formed of non-wrapped elastic 18.23 metal cords which are continuous across the entire width of the ply, oriented at an angle of 18° in the same direction as the metal cords of the working layer 53.

According to an embodiment of the invention, the tread 6 is made up of a first layer C1 consisting of a first elastomeric compound 61, radially on the outside which comes into contact with the ground, of a second layer C2, radially in contact with the first layer, made up of the first compound 61 and of a second elastomeric compound 62, and of a third layer C3, radially furthest towards the inside, formed of a combination of the first compound 61, of the second compound 62 and of the fourth compound 63.

According to an embodiment of the invention, the first elastomeric compound 61 has an electric resistivity per unit volume such that log($\rho_1$) is equal to 3 and therefore less than 6.

The second elastomeric compound 62 that forms at least the axially outer parts of the layer C2 has an electrical resistivity per unit volume such that log($\rho_2$) is equal to 10 and therefore greater than 8.

The fourth elastomeric compound 63 forming at least the axially outer parts of the layer C3 has a maximum value of tan ($\delta$), denoted tan($\delta$)max, equal to 0.045 and therefore less than 0.080.

Figure 2:
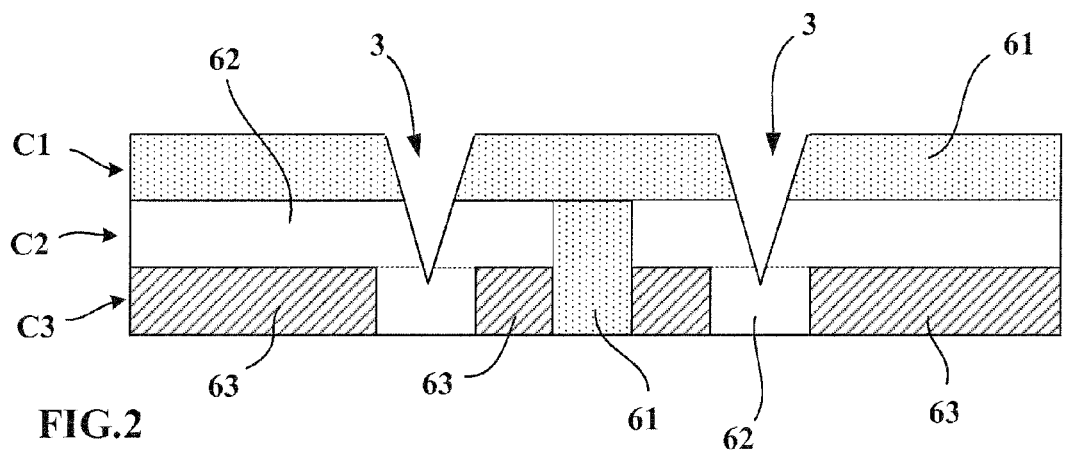

FIG. 2 very schematically illustrates a partial meridian view of the tread 6 of a tire 1 according to a first embodiment of the invention.

According to this first embodiment of the invention, the tread comprises two circumferential grooves 3, thus forming three ribs 4.

The layer C2 comprises a part formed of the first elastomeric compound 61 and two parts formed of the second elastomeric compound 62. The part formed of the first elastomeric compound 61 is centred on the circumferential mid-plane of the tire.

The layer C3 comprises a part formed of the first elastomeric compound 61 radially extending the part of the layer C2 formed of the same compound 61; these two parts made up of the elastomeric compound 61 thus form a conductive path from the reinforcement to the surface of the tread.

The layer C3 comprises two parts formed of the second elastomeric compound 62, the said parts being centered respectively on circumferential planes passing through each of the grooves 3.

The layer C3 also comprises four parts formed of the fourth compound 63 axially in contact on either side with the parts formed of the compound 62.

The ratio of the volume of the first elastomeric compound 61 to the sum of the volumes of the three compounds 61, 62 and 63 is equal to 64%.

The ratio of the volume of the second elastomeric compound 62 to the sum of the volumes of the three compounds 61, 62 and 63 is equal to 19%.

The ratio of the volume of the fourth elastomeric compound 63 to the sum of the volumes of the three compounds 61, 62 and 63 is equal to 17%.

Figure 3:
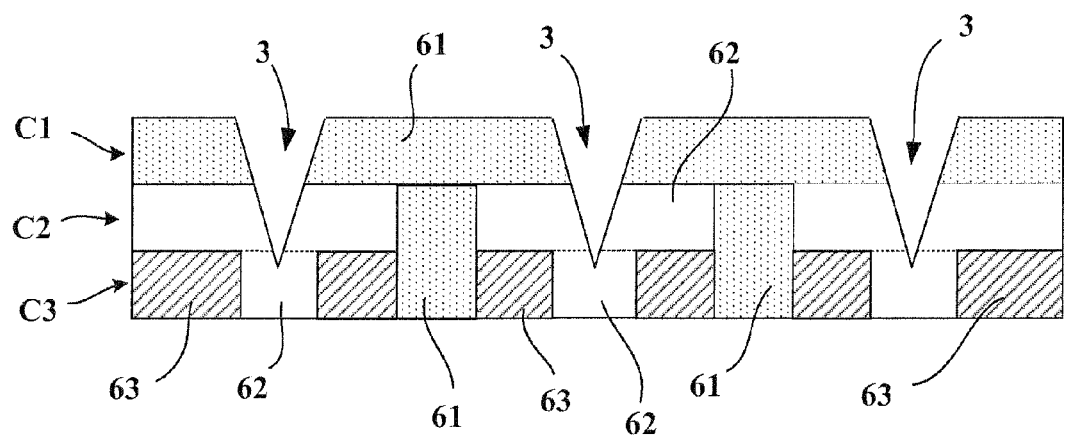

FIG. 3 very schematically illustrates a partial meridian view of the tread 6 of a tire 1 according to a second embodiment of the invention.

According to this second embodiment of the invention, the tread comprises three circumferential grooves 3, thus forming four ribs 4.

The layer C2 comprises two parts formed of the first elastomeric compound 61 and three parts formed of the second elastomeric compound 62. The two parts formed of the first elastomeric compound 61 are axially distributed on each side of the groove 3 centered on the circumferential mid-plane of the tire. The electrically conductive path consisting of the parts formed of the first elastomeric compound 61 is thus centered on a circumferential plane that does not pass through a groove 3 thus optimizing the area of conduction with the ground.

The layer C3 comprises two parts formed of the first elastomeric compound 61 radially extending the two parts of the layer C2 which are formed of the same compound 61; these parts made up of the elastomeric compound 61 thus form a conductive path from the reinforcement to the surface of the tread.

The layer C3 comprises three parts formed of the second elastomeric compound 62, the said parts being centered respectively on circumferential planes passing through each of the grooves 3.

The layer C3 also comprises six parts formed of the fourth compound 63 axially in contact on either side with the parts formed of the compound 62.

The ratio of the volume of the first elastomeric compound 61 to the sum of the volumes of the three compounds 61, 62 and 63 is equal to 68%.

The ratio of the volume of the second elastomeric compound 62 to the sum of the volumes of the three compounds 61, 62 and 63 is equal to 19%.

The ratio of the volume of the third elastomeric compound 63 to the sum of the volumes of the three compounds 61, 62 and 63 is equal to 13%.

Figure 4:
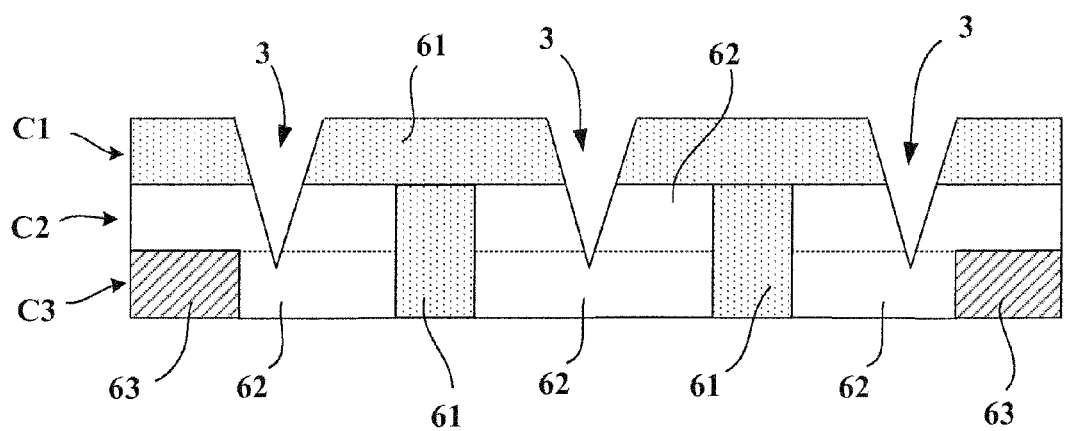

FIG. 4 very schematically illustrates a partial meridian view of the tread 6 of a tire 1 according to a third embodiment of the invention. This is in fact an alternative form of the second embodiment illustrated in FIG. 3.

According to this third embodiment of the invention, the tread also comprises three circumferential grooves 3, and only the third layer C3 is different.

The layer C3 comprises just two parts formed of the fourth elastomeric compound 63 forming the axially outer parts of the third layer.

The ratio of the volume of the first elastomeric compound 61 to the sum of the volumes of the three compounds 61, 62 and 63 is equal to 68%.

The ratio of the volume of the second elastomeric compound 62 to the sum of the volumes of the three compounds 61, 62 and 63 is equal to 25%.

The ratio of the volume of the third elastomeric compound 63 to the sum of the volumes of the three compounds 61, 62 and 63 is equal to 7%.

Compared with the tire illustrated in FIG. 3, the tire of FIG. 4 does not perform as well in terms of rolling resistance.

Two tires were produced based on the three elastomeric compounds described hereinbelow with some of their properties.

|  | Compound A | Compound B | Compound C |
|---|---|---|---|
| NR | 80 | 100 | 100 |
| BR | 20 |  |  |
| N234 | 48 |  |  |
| N683 |  |  | 35 |
| Silica (165) m2/G |  | 50 | 10 |
| N330/Coupling agent |  | 5/5 | 1/1 |
| Covering agent |  |  |  |
| Antioxidant | 3 | 2.5 | 1 |
| PARAFFIN | 1 | 1 |  |
| STEARIC ACID | 2 | 2.5 | 1.5 |
| ZnO | 3 | 3 | 4.5 |
| SULPHUR | 1.5 | 1.5 | 1.5 |
| Accelerator (CBS) | 0.9 | 1.8 | 1.4 |
| $\tan(\delta)_{max}$ | 0.135 | 0.080 | 0.045 |
| Resistivity - $\log(\rho)$ | 3.8 | 10.4 | 10 |

The first tire is a reference tire R produced to a configuration corresponding to conventional productions as described hereinabove, consisting of two radially superposed layers, the radially inner layer being formed of a single elastomeric compound. It combines a compound A present radially on the outer side of the tread and a radially inside compound C. The volume of compound C is defined in the conventional way by a person skilled in the art so that the operating temperature of the tire corresponds to the driving envisaged with such a tire. In this particular instance, the volume of compound C represents 17% of the sum of the volumes of compounds A and C.

The second tire T according to the invention and more particularly to the scenario of FIGS. 1 and 3 combines, in order to form the tread, compound A, which corresponds to compound 61, compound B, which corresponds to compound 62, and compound C, which corresponds to compound 63.

In order to make a comparison, similar tests were run with the two tires.

The first tests involved evaluating the distance covered by the tires before they needed to be retreaded.

The tests are carried out under defined load and speed conditions to lead to tread wear and tread attack of the reference tire R that allow it to be retreaded after a certain distance, assigned the value 100, covered under the said conditions of this test. The wearing performance is evaluated on a heavy vehicle when driving on an open road over routes representative of the usage to which heavy vehicles are conventionally put. Values lower than 100 express inferior wear performance.

The results obtained are given in the following table:

|  | Tire R | Tire T |
|---|---|---|
| Wear | 100 | 95 |

These results show that the tire according to the invention allows running that is substantially equivalent to the distance covered by the reference tire before retreading is needed.

Rolling resistance measurements were also carried out on each of the tires under identical running conditions. The results of the measurements are shown in the following table; they are expressed in kg/t, with a value of 100 assigned to tire R. Values below 100 express superior performance in terms of rolling resistance.

|  | Tire R | Tire T |
|---|---|---|
|  | 100 | 90 |

These results show that the tire according to the invention offers performance in terms of rolling resistance which is superior to the reference tire.

These results show that combining three layers to form the tread makes it possible for example to offset the compromise between wearing performance and rolling resistance.

Moreover, according to the invention, the presence of the electrically conductive paths through the radially innermost layers makes it possible to ensure that electrostatic charge is discharged more effectively than in the reference tire.

The invention claimed is:

1. A tire with radial carcass reinforcement comprising a crown reinforcement itself capped radially with a tread of which the tread pattern comprises at least two circumferential grooves, which is connected to two beads via two sidewalls, the tread comprising at least three layers (C1, C2, C3) of elastomeric compounds which are radially superposed, wherein a first layer (C1) forming the radially outer part of the tread is made up of at least one first elastomeric compound having an electrical resistivity per unit volume $\rho_1$ such that $\log(\rho_1)$ is less than 6, wherein a second layer (C2) of elastomeric compounds radially on the inside of and in contact with the first layer (C1) of elastomeric compound is made up of at least three parts, wherein at least axially outer parts of the second layer (C2) are made up of a second elastomeric compound having an electrical resistivity per unit volume $\rho_2$ such that $\log(\rho_2)$ is greater than 10, wherein at least part of the second layer, which extends radially from and is in direct contact with the at least one first elastomeric compound of the said first layer, is made up of a third elastomeric compound having an electrical resistivity per unit volume $\rho_3$ such that $\log(\rho_3)$ is less than 6, wherein a third layer (C3) of elastomeric compounds radially furthest towards the inside is made up of at least five parts, wherein at least axially outer parts of the third layer (C3) are made up of a fourth elastomeric compound having a maximum value of tan(d), denoted tan(d) max, of less than 0.080, wherein at least two parts of the third layer (C3), which are axially in contact with at least one axially outer part of the third layer (C3), are made up of the second elastomeric compound, and wherein at least one part of the third layer (C3), which extends radially and is in direct contact with the at least one part of the said second layer (C2) made up of the third elastomeric compound, is made up of the third elastomeric compound.

2. The tire according to claim 1, wherein the distance between a point on the wall forming a groove and the fourth elastomeric compound is greater than 1 mm.

3. The tire according to claim 1, wherein the at least two parts of the third layer (C3) that are made up of the second elastomeric compound are axially centered on a circumferential plane passing through one of the at least two circumferential grooves.

4. The tire according to claim 1, wherein the tread pattern comprises an even number of circumferential grooves wherein the second layer comprises an odd number of parts made up of the third elastomeric compound.

5. The tire according to claim 4, wherein the third layer (C3) of elastomeric compounds comprises an even number of parts made up of the second elastomeric compound.

6. The tire according to claim 1, wherein the tread pattern comprises an odd number of circumferential grooves, wherein the second layer of elastomeric compounds is made up of at least five parts, and wherein the second layer (C2) comprises an even number of parts made up of the third elastomeric compound.

7. The tire according to claim 6, wherein the said third layer (C3) of elastomeric compounds comprises an odd number of parts made up of the second elastomeric compound.

8. The tire according to claim 1, wherein the ratio of the volume of the first elastomeric compound to the sum of the volumes of the four elastomeric compounds is between 25 and 70%.

9. The tire according to claim 1, wherein the ratio of the volume of the third elastomeric compound to the sum of the volumes of the four elastomeric compounds is between 5 and 10%.

10. The tire according to claim 1, wherein the ratio of the volume of the second elastomeric compound to the sum of the volumes of the four elastomeric compounds is between 10 and 40%.

11. The tire according to claim 1, wherein the ratio of the volume of the fourth elastomeric compound to the sum of the volumes of the four elastomeric compounds is less than 25%.

12. The tire according to claim 1, wherein the third elastomeric compound present in the second and third layers (C2, C3) is identical to the first elastomeric compound.

* * * * *